United States Patent [19]

Fukuoka

[11] Patent Number: 5,089,733
[45] Date of Patent: Feb. 18, 1992

[54] DRIVING APPARATUS FOR DC BRUSHLESS MOTOR

[75] Inventor: Toshiaki Fukuoka, Yonago, Japan
[73] Assignee: Matsushita Electrical Industrial Co., Japan
[21] Appl. No.: 576,652
[22] Filed: Sep. 4, 1990
[51] Int. Cl.⁵ .............................................. H02K 37/00
[52] U.S. Cl. .................. 310/67 R; 310/68 B; 310/68 R; 310/156
[58] Field of Search ............... 310/67 R, 68 B, 68 R, 310/156, DIG. 6; 318/138, 254, 439

[56] References Cited
U.S. PATENT DOCUMENTS

| | | | |
|---|---|---|---|
| 4,521,815 | 6/1985 | Tokuyama | 360/70 |
| 4,737,674 | 4/1988 | Miyao | 310/156 |
| 4,801,830 | 1/1989 | Ogino et al. | 310/DIG. 6 |
| 4,947,071 | 8/1990 | Clarke | 310/156 |

Primary Examiner—Steven L. Stephan
Assistant Examiner—Matt Nguyen

[57] ABSTRACT

In a DC brushless motor, a position detecting magnet (1b, 31b) is arranged in correspondence with a driving magnet (1a, 31a) which is for causing torque, and the position detecting magnet (1b, 31b) includes a non-magnetized part in each pole to make a predetermined distribution of flux which can be detected by only one magnetic detecting element (7); and signals detected by the magnetic detecting element are developed into three (or two)-phase full-wave driving signals through a necessary signal processing circuit (14) etc.

3 Claims, 13 Drawing Sheets

DRIVING APPARATUS FOR DC BRUSHLESS MOTOR

FIELD OF THE INVENTION AND RELATED ART STATEMENT

1. Field of the Invention

The present invention relates to a driving apparatus for DC brushless motor of three-phase or two-phase driving using one magnetic detecting element.

2. Description of the Related Art

In recent years, an excellent controllability of a small size DC motor has been recognized in an industrial field of information processing as well as that of acoustics, and employment of the small size DC motor has increased rapidly in these industrial fields. Among such small size DC motor, employment of a DC brushless motor has increased in a field of industrial use motor which is required to have a high reliability. This is because the brushless DC motor has no sliding contact member such as a brush or a commutator and thereby has a long lifetime. For instance, driving method of a small size axial fan has been changed for several years from AC to DC, and the number of a DC axial fan using the DC brushless motor has been rising steadily.

It is necessary for the DC axial fan to mount a driving circuit in a limited compact space and to be of low cost. In order to satisfy these needs, two-phase half-wave driving method is employed from among several driving methods by the reason that the driving control signal is derived from only one magnetic detecting element and the wiring is easy.

Hereafter, the above-mentioned conventional two-phase half-wave driving method is described with reference to the accompanying drawings. FIG. 10(a) is a circuit diagram showing a driving circuit of a generally known two-phase half-wave driving method. A driving coil 51 of "A" phase and a power transistor 53 are connected in series with each other, and also a driving coil 52 of "B" phase and a power transistor 54 are connected in series with each other. FIG. 10(b) is an illustration showing a developed distribution map of magnetization of a rotor magnet 55 which consists of a driving part 55a and a position detecting part 55b. FIG. 10(c) is a graph showing induced voltage waveforms generated in the driving coils 51 and 52. A solid curve represents a voltage waveform of the driving coil 51, and a dotted curve represents a voltage waveform of the driving coil 52. FIG. 10(d) is a graph showing a curve of magnetic flux distribution given by the position detecting part 55b of the rotor magnet 55.

Magnetic flux generated by the position detecting part 55b of the rotor magnet 55 is detected by a position detecting element (not shown). In response to the output signal from the position detecting element, the power transistors 53 and 54 are alternately turned on at every range of 180° el. The driving coils 51 and 52 are thereby excited alternately, and the rotor magnet 55 is rotated. However, when the rotor magnet 55 stopped at a dead point in FIG. 10(c) where induced voltage is zero volt, it is impossible to re-start the motor by itself. Therefore, the motor is required to have a construction not to stop at the above-mentioned zero voltage point to re-start by itself. For instance, when a reluctance is made by forming a non-uniform gap (not shown) between a stator core (not shown) and the rotor magnet 55, starting torque can always be generated at the time of starting. Thus, the rotor magnet 55 can start from any position.

FIGS. 11(a), 11(b), 11(c) and 11(d) concern another conventional two-phase half-wave driving method disclosed in Japanese patent publication (Tokko)Sho 43-8771. FIG. 11(a) is a circuit diagram showing a driving circuit. A driving coil 61 of "A" phase and a power transistor 63 are connected in series with each other, and also a driving coil 62 of "B" phase and a power transistor 64 are connected in series with each other. FIG. 11(b) is an illustration showing a developed distribution map of magnetization of a rotor magnet 65 which consists of a driving magnet 65a and a position detecting magnet 65b. In the driving magnet 65a, an O pole (non-magnetized part) is provided between an N pole and an S pole. The position detecting magnet 65b has an N pole and an S pole only. FIG. 11(c) is a graph showing induced voltage waveforms generated in the driving coils 61 and 62. A solid curve represents a voltage waveform of the driving coil 61, and a dotted curve represents a voltage waveform of the driving coil 62. FIG. 11(d) is a graph showing a distribution curve of magnetic flux given by the position detecting part 65b of the rotor magnet 65. Magnetic flux generated by the position detecting part 65b of the rotor magnet 65 is detected by a position detecting element (not shown), and the power transistors 63 and 64 are alternately turned on at every range of 180° el, thereby rotating the rotor magnet 65.

According to the above construction of the rotor magnet 65, by appropriately selecting a configuration of a stator core (not shown), the induced voltage takes positive values during a range of over 180° el. As a result, the induced voltages generated in the driving coils 61 and 62 never take zero volt at the same time to each other, thereby making no dead-point in the whole angular range. Therefore, it is always possible to start the motor from any position.

The above-mentioned two-phase half-wave driving method can be embodied by a simple construction. However, an efficiency of the motor is very low because of the half-wave and the two-phase. As a result, power consumption of the motor must unavoidably be large, and also, both the magnet and the windings are large and heavy unfavorably.

As a method for driving the brushless motor with more than two phases by only one magnetic detecting element, three-phase half-wave driving method, which is shown in FIGS. 12(a), 12(b), 12(c), 12(d), and 12(e), is known. FIG. 12(a) is a circuit diagram showing a driving circuit. Power transistors 74, 75 and 76 are connected in series with driving coils 71 ("A" phase), 72 ("B" phase) and 73 ("C" phase), respectively. FIG. 12(b) is an illustration showing a developed distribution map of magnetization of a rotor magnet 77 which consists of a driving magnet 77a and a position detecting magnet 77b. The driving magnet 77a has an N pole and an S pole, and the position detecting magnet 77b has an O pole (non-magnetized part) between an N pole and an S pole. FIG. 12(c) is a graph showing induced voltage waveforms generated in the driving coils 71, 72 and 73. A solid curve represents a voltage waveform of the driving coil 71, and a dotted curve and a chain curve represent voltage waveforms of the driving coils 72 and 73, respectively. FIG. 12(d) is a graph showing a distribution curve of magnetic flux generated by the position detecting part 77b of the rotor magnet 77. FIG. 12(e) is a graph showing a driving signal for the motor. The distribution curve in FIG. 12(d) is processed by plus and minus threshold values shown by chain lines through a logic circuit (not shown) so as to make the signal having three values shown in FIG. 12(e). When the power transistors 74, 75 and 76 are sequentially turned on by three signals each consisting of the above-mentioned three-value signal at every 120° el, the motor is driven without any dead point. In this method, however, the efficiency is still not as good as possible because of the half-wave.

OBJECT AND SUMMARY OF THE INVENTION

An object of the present invention is to provide a driving apparatus for DC brushless motor which is capable of three-phase or two-phase full-wave driving by only one magnetic detecting element and realizes both a high efficiency and a very small consumable current.

In order to achieve the above-mentioned object, the driving apparatus for DC brushless motor of the present invention comprises:

a driving magnet which is for causing torque and has plural number of magnetized poles;

a position detecting magnet which is for generating a position signal and has the plural number of regions corresponding to the magnetized poles, the regions including a non-magnetized part and at least one magnetized pole of same kind as a corresponding pole of the driving magnet;

a magnetic detecting element for detecting magnetic flux which is generated by the position detecting magnet;

an amplifier for amplifying a position signal issued from the magnetic detecting element;

a waveform shaping circuit for separating an output signal of the amplifier into plural signals corresponding to the regions of the position detecting magnet;

a signal processing circuit for composing full-wave driving signals from the plural signals; and a driving circuit for applying the full-wave driving signals to a driving coil of the DC brushless motor.

The above-mentioned DC brushless motor realizes three-phase full-wave driving and two-phase full-wave driving which are of high efficiency in both volume and current. The high efficiency in current contributes to the reduction of current capacity of the motor, thereby saving energy and lowering costs. Since torque ripple of the above-mentioned motor is small in comparison with that of the half-wave driving, vibration and noise are reduced. Further, since the number of the magnetic detecting element is only one, construction for wiring is simple.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Figure 1:
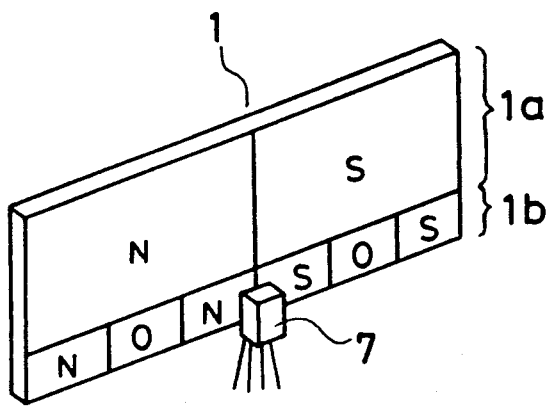
FIG. 1 is an illustration, developed on a plane, showing a distribution map of magnetization of a ring-shaped rotor magnet 1 in accordance with a first embodiment of the present invention.
Figure 2:
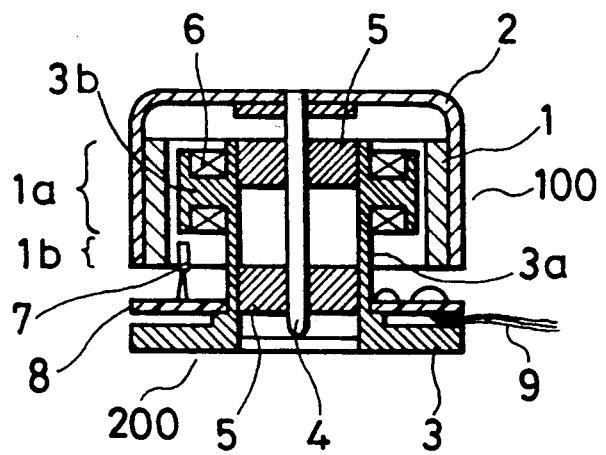
FIG. 2 is a cross-sectional view showing a DC brushless motor including the above-mentioned rotor magnet 1.
Figure 3:
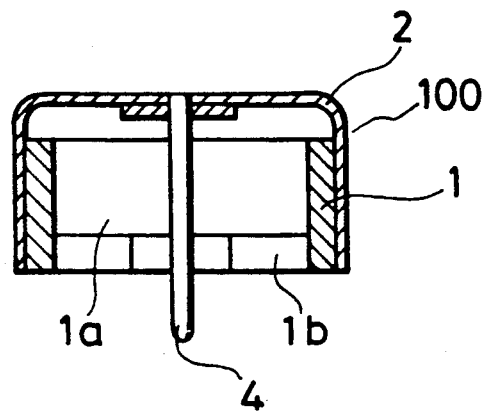
FIG. 3 is a cross-sectional view showing only a rotor 100 in FIG. 2.

Hereafter, preferred embodiments of the present invention are described with reference to the accompanying drawings. FIG. 1 is an illustration, developed on a plane, showing a distribution map of magnetization of a ring-shaped rotor magnet 1. Construction of this rotor magnet 1 will be described later. FIG. 2 is a cross-sectional view showing a DC brushless motor including the above-mentioned rotor magnet 1. FIG. 3 is a cross-sectional view showing only a rotor 100 in FIG. 2. In FIGS. 2 or 3, the ring-shaped rotor magnet 1 is fixed on an internal surface of a rotor frame 2. A rotor shaft 4 fixed to the center of the rotor 100 is rotatably held by a bearing 5 which is mounted in a cylindrical part 3a of a supporting stand 3. A stator core 3b is formed on the cylindrical part 3a, and a driving coil 6 is wound around the stator core 3b. A circuit substrate 8 is fixed to the supporting stand 3, and a magnetic detecting element 7 is provided on the circuit substrate 8. The magnetic detecting element 7 is disposed to oppose the position detecting part 1b with a minute gap therebetween. The circuit substrate 8 is electrically connected to an external circuit (not shown) via wires 9. One of the constructional features of the present invention lies in the magnetizing distribution of the rotor magnet 1. The rotor magnet 1 consists of a driving magnet 1a and a position detecting magnet 1b. The driving magnet 1a has an N pole and an S pole. The position detecting magnet 1b has two types of alignment such that an O pole, which does not generate magnetic flux and has one-third width of that of the N or S pole of the driving magnet 1a, is provided between a pair of N poles or S poles. N-O-N alignment is adopted corresponding to the N pole of the driving magnet 1a, and S-O-S alignment is adopted corresponding to the S pole of the driving magnet 1a. The above-mentioned magnetizing distribution can be easily realized by specially designing a configuration of a magnetizing yoke (not shown), which is for magnetizing the rotor magnet 1, or by making a cut-off part in a plastic magnet or a rubber magnet.

Figure 4A:
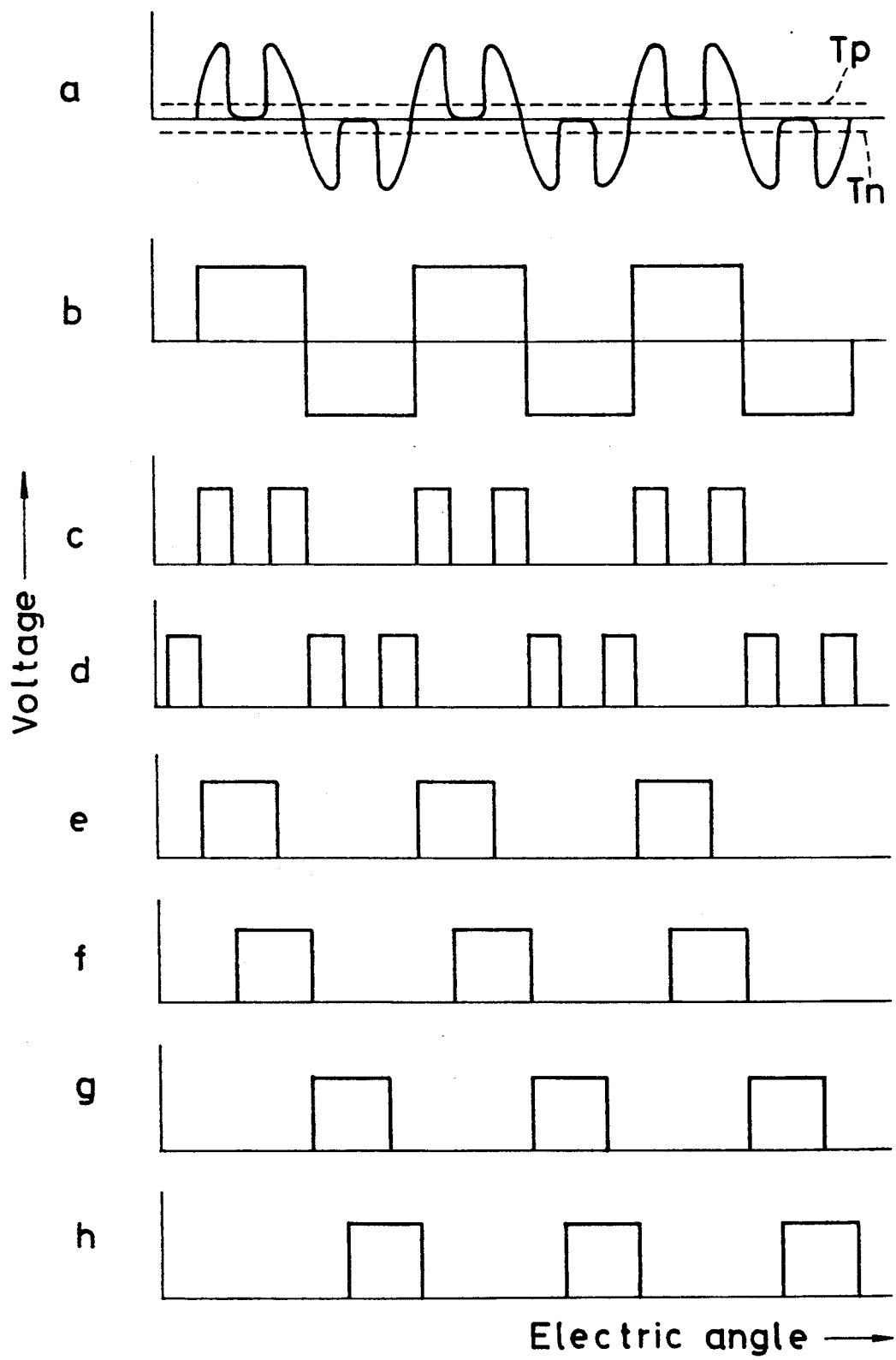
FIGS. 4(a) and FIG. 4(b) are graphs showing waveforms of output signals in signal processing of the first embodiment of the present invention.
Figure 4B:
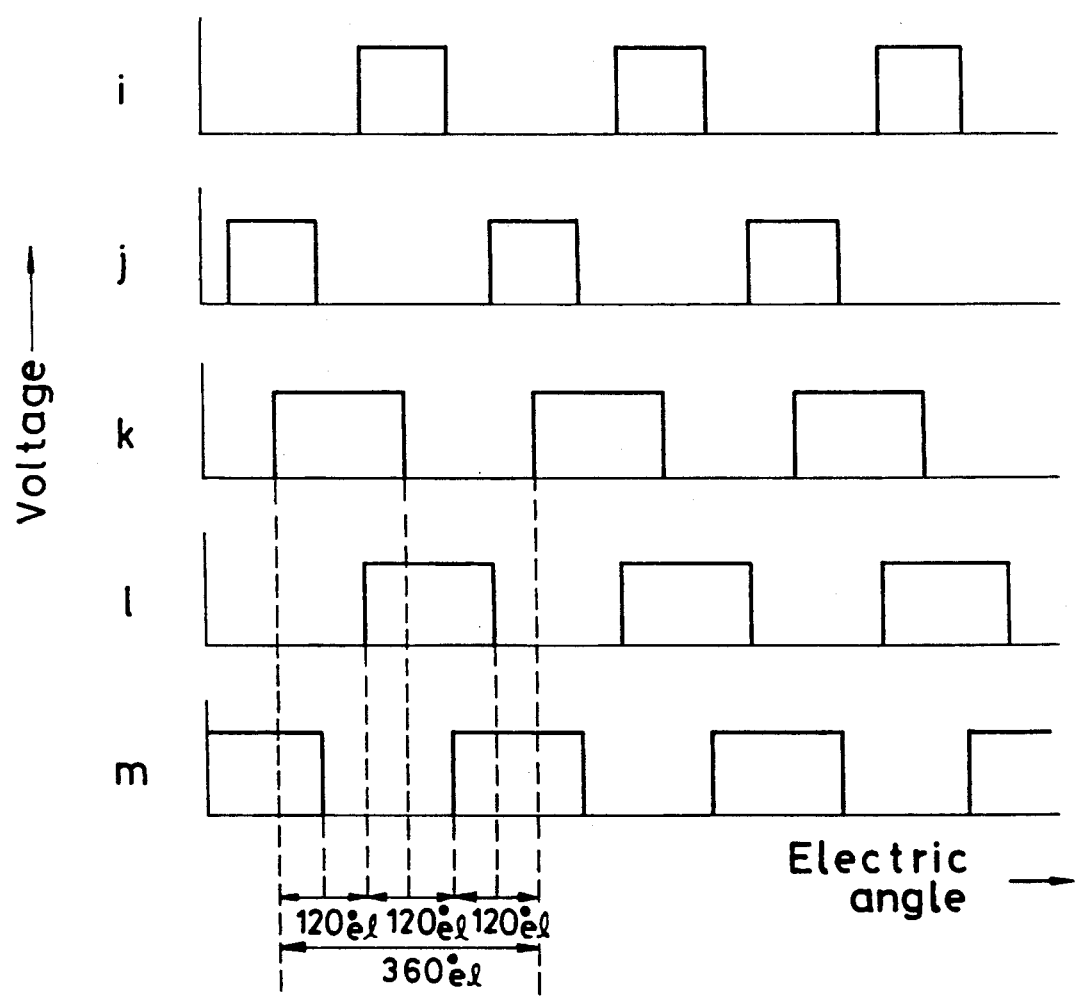

Next, a system for making three-phase full-wave driving signals from an output signal of the magnetic detecting element 7 is described with reference to FIG. 4(a), FIG. 4(b) and FIG. 5. The magnetic detecting element 7 such as a Hall element detects magnetic flux of the position detecting magnet 1b, and an output signal issued from the magnetic detecting element 7 has a waveform "a" shown in FIG. 4(a). This output signal is processed through an amplifier 12 (FIG. 5), and thereafter an output signal waveform issued from the amplifier 12 is shaped by a waveform shaping circuit 13 (FIG. 5) which has a threshold characteristic effecting upon both the upper part and the lower part of the waveform. As a result, rectangular-wave train signals "c" and "d" as shown in FIG. 4(a) are obtained. These signals are processed in a signal processing circuit 14 together with a signal having a waveform "b" which is derived by amplifying the signal "a". Positive signals of the waveform "b" and an inverted signal of the rectangular-wave train signal "c" are processed in the signal processing circuit 14, thereby resulting in rectangular-wave train signals "e" and "f". Similarily, negative inverted signals of the waveform "b" and an inverted signal of the rectangular wave train signal "d" are processed in the signal processing circuit 14, thereby resulting in rectangular-wave train signals "g" and "h". In the above-mentioned four signals "e", "f", "g" and "h", when the signals "e" and "h" are processed in a NOR circuit, a rectangular-wave train signal "i" is obtained, and when the signals "f" and "g" are processed in the NOR circuit, a rectangular-wave train signal "j" is obtained. Further, a rectangular-wave train signal "k" is obtained by synthesizing the signals "e" and "f". In the similar way, a rectangular-wave train signal "l" is obtained from the signals "g" and "i", and a rectangular-wave train signal "m" is obtained from the signals "h" and "j". Three rectangular-wave train signals "k", "l" and "m" are shifted in phase by 120° el to each other. These three signals are outputted to a driving circuit 15 (FIG. 5), and the motor M (FIG. 5) is driven by three-phase full-wave driving signals each having a signal width of 180° el. In case where six rectangular-wave train signals "e"–"j" are adopted to drive the motor, it is possible to realize the three-phase full-wave driving based on a signal width of 120° el.

Figure 6:
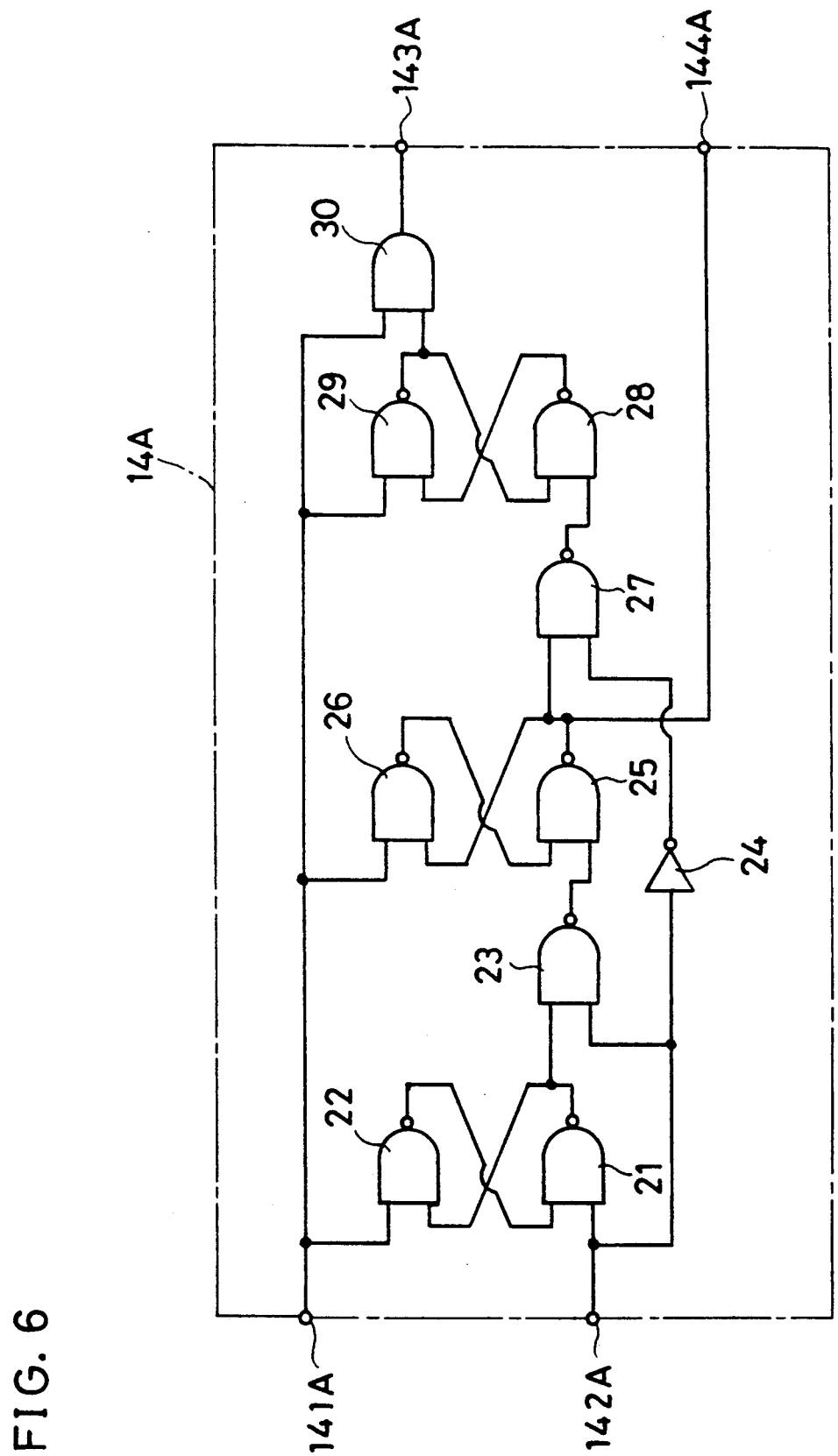
FIG. 6 is a circuit diagram showing a main circuit 14A of a signal processing circuit 14 in FIG. 5.

Next, a concrete embodiment of the signal processing circuit 14 is described. FIG. 6 is a circuit diagram showing a main circuit 14A of the signal processing circuit 14. In FIG. 6, a pair of logic element 21 and 22 make a cross-coupling connection with each other. That is, an output terminal of the logic element 21 is connected to a first input terminal of the logic element 22, and an output terminal of the logic element 22 is connected to a first input terminal of the logic element 21. Similarly, a pair of logic elements 25 and 26 and a pair of logic elements 28 and 29 make the above-mentioned cross-coupling connections, respectively. Second input terminals of the logic elements 22, 26 and 29 are connected to a first input end 141A of the main circuit 14A. A second input terminal of the logic element 21 is connected to a second input end 142A. A first input terminal of a logic element 23 is connected to the output terminal of the logic element 21 and its second input terminal is connected to the second input end 142A. An output terminal of the logic element 23 is connected to a second input terminal of the logic element 25. A first input terminal of a logic element 27 is connected to an output terminal of the logic element 25 and its second input terminal is connected to an output terminal of an inverter 24 whose input terminal is connected to the second input end 142A. A second input terminal of the logic element 28 is connected to an output terminal of the logic element 27. A first input terminal of a logic element 30 is connected to an output terminal of the logic element 29 and its second input terminal is connected to the first input end 141A.

A first signal, which is sufficiently amplified by the amplifier 12 (FIG. 5), is supplied to the input end 141A to which second terminals of the logic elements 22, 26, 29 and 30 are connected. A second signal issued from the waveform shaping circuit 13 (FIG. 5) is supplied to the second input end 142A to which the second terminals of the logic elements 21, 23 and the inverter 24 are connected. The above-mentioned first and second signals are processed through a sequential circuit consisting of the logic elements 21–30, and sequentially processed signals are issued from the output terminals of the logic elements 30 and 25 as a first output signal and a second output signal, respectively.

Figure 6A:
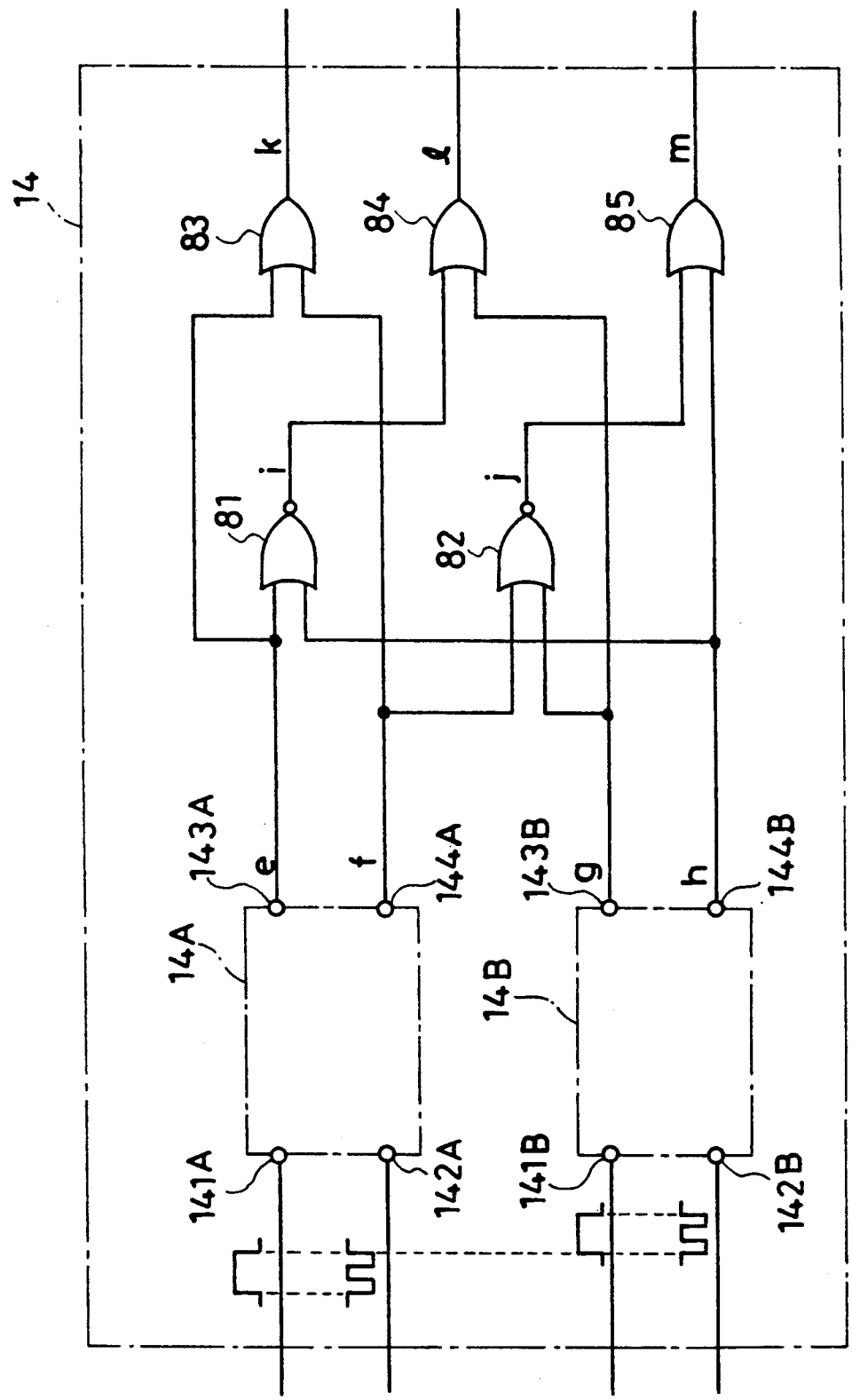
FIG. 6a is a circuit diagram showing the signal processing circuit 14.

FIG. 6a is a circuit diagram showing the whole circuit of the signal processing circuit 14. The signal processing circuit 14 consists of a pair of main circuits 14A, 14B, a pair of NOR circuit elements 81, 82 and three OR circuit elements 83, 84 and 85. The main circuit 14A has been shown in FIG. 6, and the main circuit 14B is the same circuit as the main circuit 14A. Input ends 141B and 142B correspond to the input ends 141A and 142A, respectively. Output ends 143B and 144B correspond to the output ends 143A and 144A, respectively.

When a positive signal of the signal "b" shown by FIG. 4(a) is supplied to the input end 141A as the first input signal, and an inverted signal of the signal "c" shown by FIG. 4(a) is supplied to the input end 142A as the second input signal, the signals "e" and "f" are obtained as the first output signals and the second output signals of the main circuit 14A, respectively. Similarly, when an inverted negative signal of the signal "b" shown by FIG. 4(a) is supplied to the input end 141B as the first input signal and an inverted signal of the signal "d" of FIG. 4(a) is supplied to the input end 142B as the second input signal, the signals "g" and "h" are obtained as the first output signals and the second output signal of the main circuit 14B, respectively. Further, as aforementioned, the signal "i" is obtained from the signals "e" and "h" by using the NOR circuit element 81, and also the signal "j" is obtained from the signals "f" and "g" through the NOR circuit element 82. Three signals k, l and m are obtained by these six signals e-j through the OR circuit elements 83, 84 and 85, respectively.

In the above-mentioned embodiment, when an initializing pulse is supplied to the first input terminals of the logic elements 22, 26 and 28 at the time of power-on, the motor makes reverse-rotation during each one duration until the signal "a" of FIG. 4(a) takes a value over a positive threshold Tp and a value below a negative threshold Tn. However, the motor turns to the forward-rotation mode as soon as the above duration lapses, and thereafter the aforementioned three-phase full-wave driving is carried out.

Next, a second embodiment of the present invention applied to the two-phase full-wave driving is described.

Figure 7A:
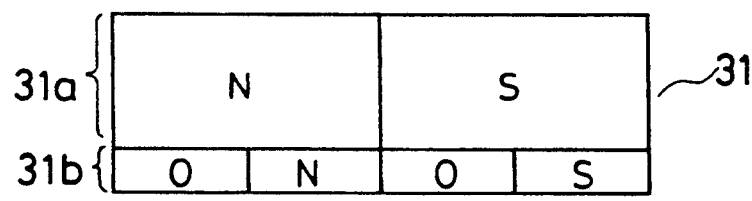
FIG. 7(a) is an illustration showing a developed distribution map of magnetization of a rotor magnet 31 in accordance with a second embodiment of the present invention.
Figure 7B:
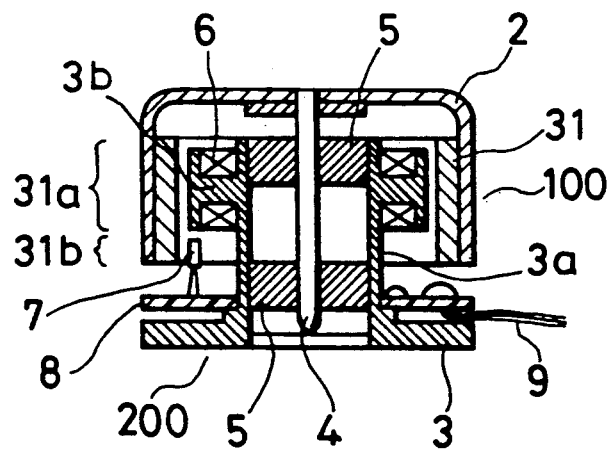
FIG. 7(b) is a cross-sectional view showing a DC brushless motor including the above-mentioned rotor magnet 31.

FIG. 7(a) is an illustration showing a developed distribution map of magnetization of a rotor magnet 31 which consists of a driving magnet 31a and a position detecting magnet 31b. In the position detecting magnet 31b, an N-pole or an S-pole, which is to be the same polarity as that of the corresponding driving magnet 31a, and an O-pole having a half width of a pole of the driving magnet 31a are provided. This O-pole, which is made by omitting magnetization or by making a cut-off area, does not generate the flux. O and N poles of the position detecting magnet 31b are arranged beside the N pole of the driving magnet 31a, and O and S poles of the position detecting magnet 31b are arranged beside the S pole of the driving magnet 31a. FIG. 7(b) is a cross-sectional view showing a DC brushless motor including the above-mentioned rotor magnet 31. Construction of the DC brushless motor is the same as that of the first embodiment except the rotor magnet 31. Two-phase full-wave driving signal is obtained by the rotor magnet 31 and one magnetic detecting element 7 as described in the following procedure.

Figure 5:
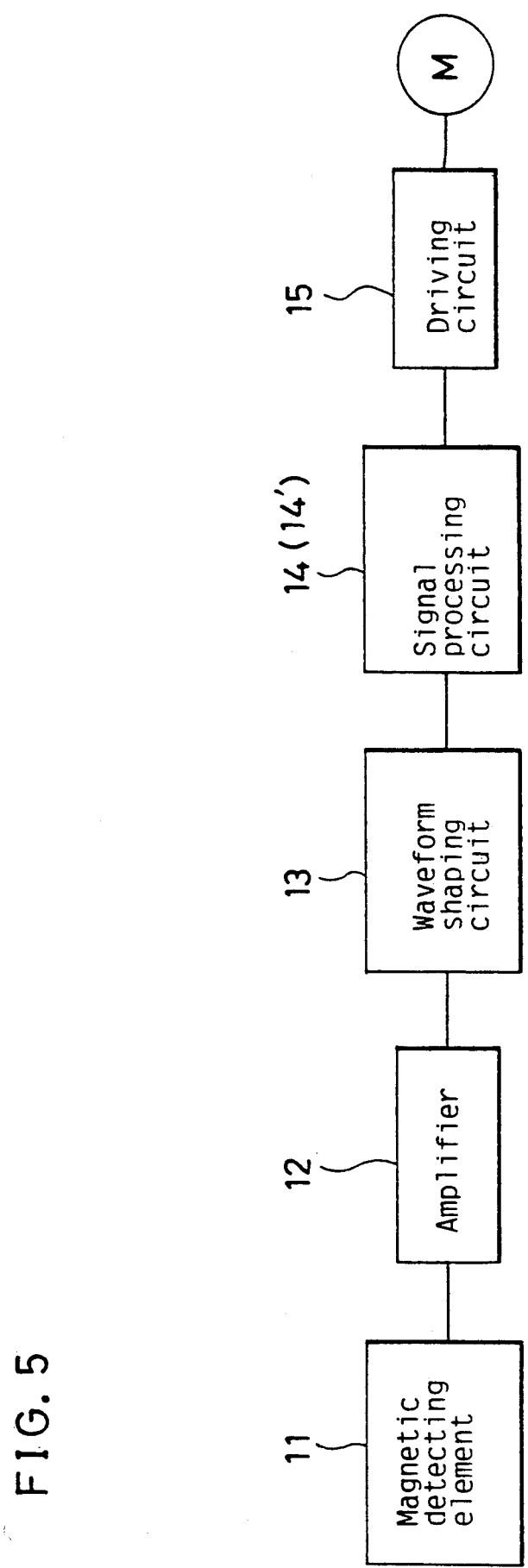
FIG. 5 is a block diagram showing a circuit of the first embodiment of the present invention.
Figure 8:
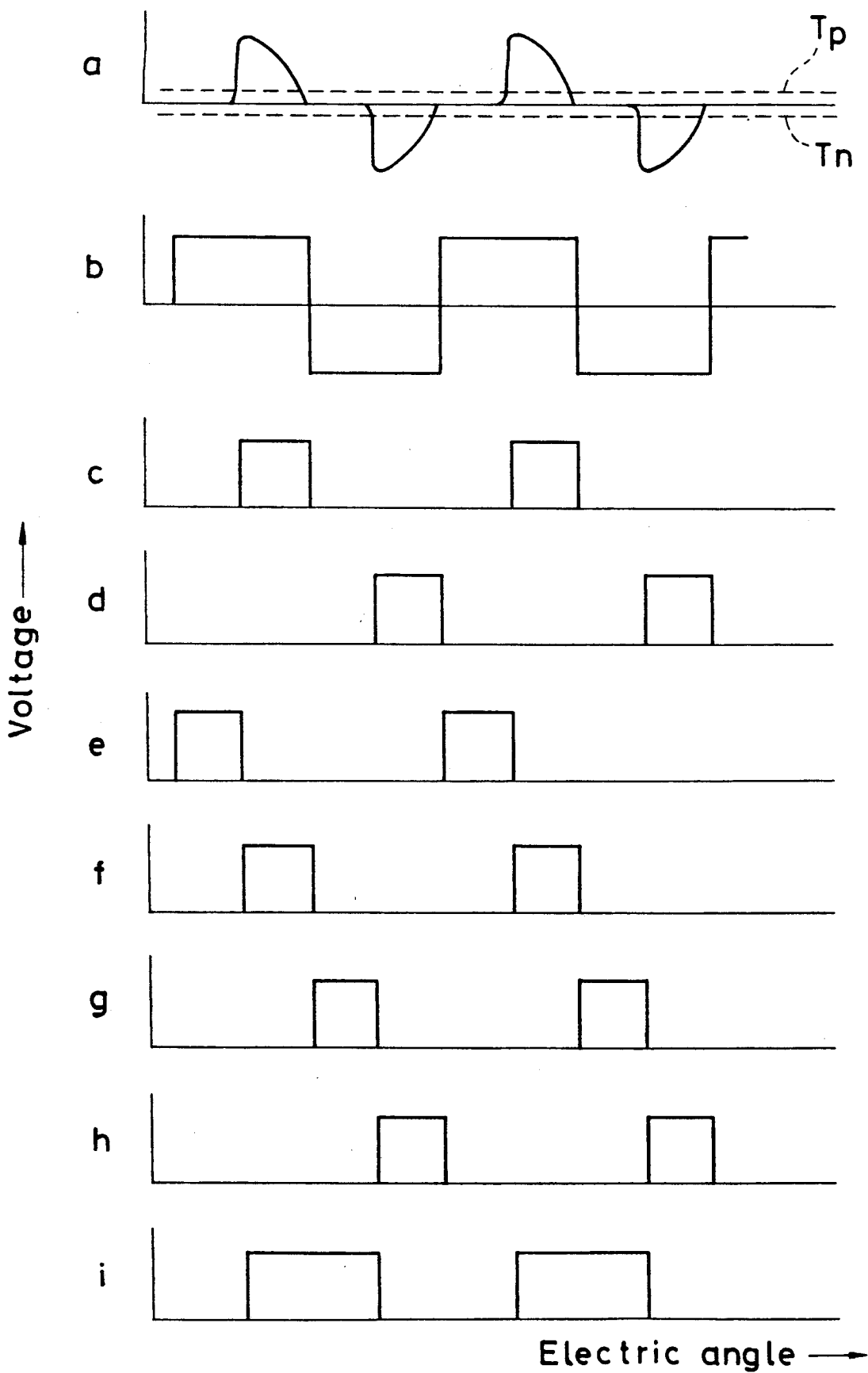
FIG. 8 is a graph showing waveforms of output signals in signal processing of the second embodiment of the present invention.

A block diagram of this second embodiment is the same as that of the first embodiment which has been already shown by FIG. 5. The magnetic detecting element 11 such as a Hall element detects magnetic flux of the position detecting magnet 31b, and an output signal issued from the magnetic detecting element 11 has a waveform "a" shown in FIG. 8. This output signal is processed through the amplifier 12 (FIG. 5), and thereafter an output signal waveform issued from the amplifier 12 is shaped by a waveform shaping circuit 13 (FIG. 5) which has a threshold characteristic effecting upon both the top part and the bottom part of the waveform. As a result, rectangular-wave train signals "c" and "d" as shown in FIG. 8 are obtained. These signals are processed in the signal processing circuit 14' together with a signal which is derived by amplifying the signal "a" shown in FIG. 8 to have a resultant waveform of "b". Positive signals of the waveform "b" and inverted signals of the waveform "c" are processed in the signal processing circuit 14', thereby resulting in rectangular-wave train signals "e" and "f". In the similar way, negative inverted signals of the waveform "b" and inverted signals of the waveform "d" are processed in the signal processing circuit 14', thereby resulting in rectangular-wave train signals "g" and "h". In the above-mentioned four signals "e", "f", "g" and "h", when the signals "f" and "g" are processed in an OR circuit, a rectangular-wave train signal "i" is obtained. This signal "i" has a phase difference of 90° el from the signal "b". By outputting these signals "i" and "b" (only positive signals) to the driving circuit 15, two-phase full-wave driving is carried out with the wave of 180° el. When four rectangular-wave train signals "e"-"h" are adopted to drive the motor, it is possible to realize the two-phase full-wave driving based on a signal width of 90° el.

Figure 9:
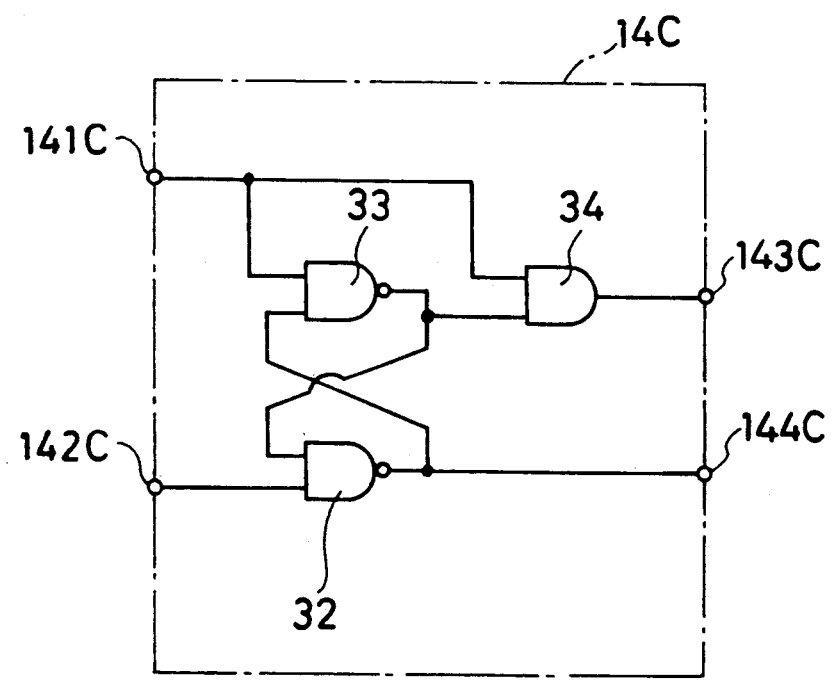
FIG. 9 is a circuit diagram showing a main circuit 14C of the signal processing circuit 14' in FIG. 5 in accordance with the second embodiment of the present invention.

Next, a concrete embodiment of the signal processing circuit 14' is described. FIG. 9 is a circuit diagram showing a main circuit 14C of the signal processing circuit 14'. In FIG. 9, a first input terminal of a logic element 32 is connected to an output terminal of a logic element 33, and a first input terminal of a logic element 33 is connected to an output terminal of the logic element 32, thereby forming a cross-coupling connection. A first input terminal of a logic element 34 is connected to the output terminal of the logic element 33 and its second input terminal is connected to the second input terminal of the logic element 33. A first input signal, which is sufficiently amplified and issued by the amplifier 12(FIG. 5), is supplied to an input end 141C to which second terminals of the logic elements 33 and 34 are connected. A second input signal, which is issued from the waveform shaping circuit 13(FIG. 5), is supplied to a second input terminal of the logic element 32 through an input end 142C. The above-mentioned first and second signals are processed through a sequential circuit consisting of the logic elements 32-34, and sequentially processed signals are issued from the output terminals of the logic elements 34 and 32 to output ends 143C and 144C as a first output signal and a second output signal, respectively.

Figure 9A:
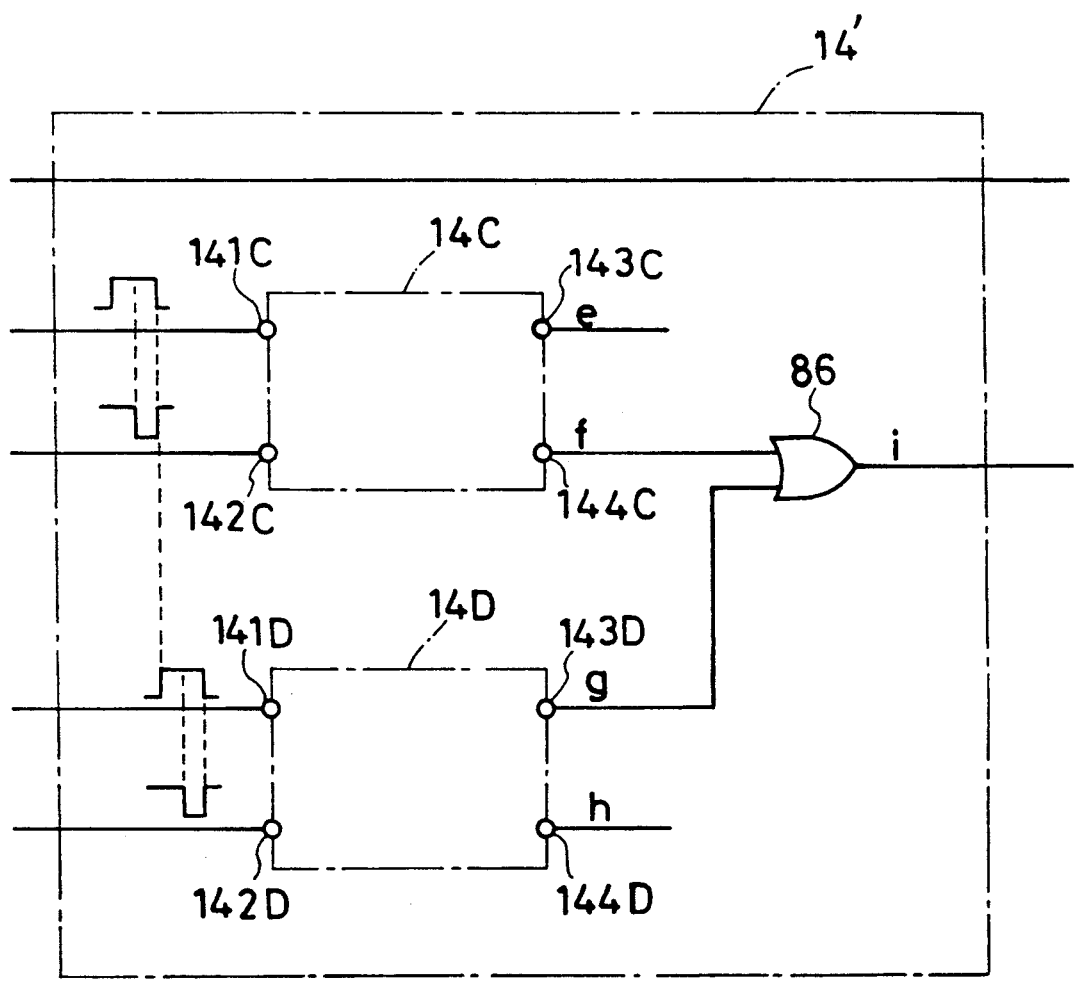
FIG. 9a is a circuit diagram showing the signal processing circuit 14'.
Figure 10A:
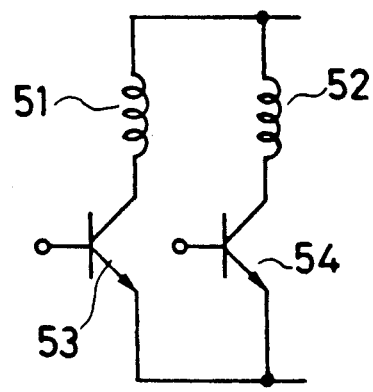
FIG. 10(a) is a circuit diagram showing a driving circuit of the conventional two-phase half-wave driving method.
Figure 10B:
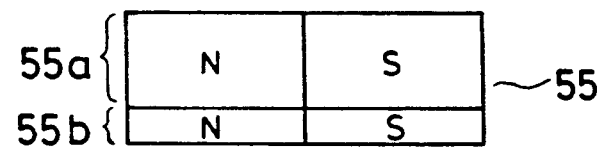
FIG. 10(b) is an illustration showing the conventional developed distribution map of magnetization of a rotor magnet 55.
Figure 10C:
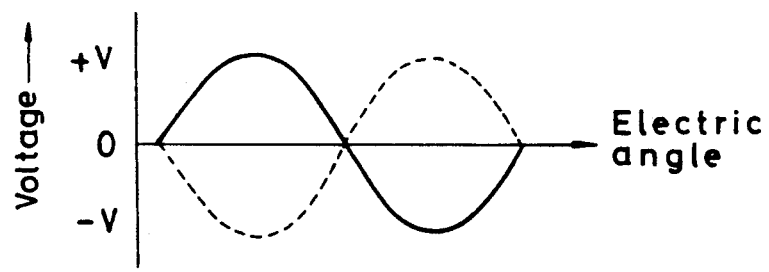
FIG. 10(c) is a graph showing induced voltage waveforms generated in the driving coils 51 and 52 in FIG. 10(a).
Figure 10D:
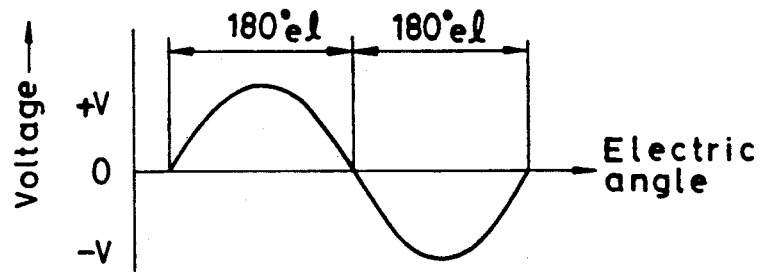
FIG. 10(d) is a graph showing a distribution curve of magnetic flux given by the position detecting part 55b of the rotor magnet 55 in FIG. 10(b).
Figure 11A:
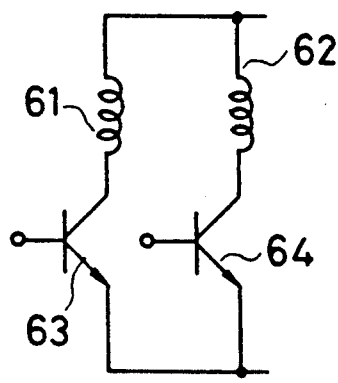
FIG. 11(a) is a circuit diagram showing the conventional driving circuit.
Figure 11B:
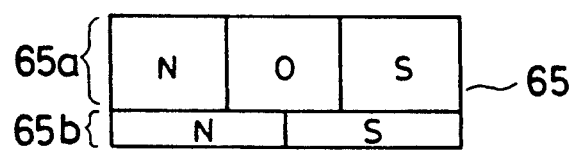
FIG. 11(b) is an illustration showing the conventional developed distribution map of magnetization of a rotor magnet 65.
Figure 11C:
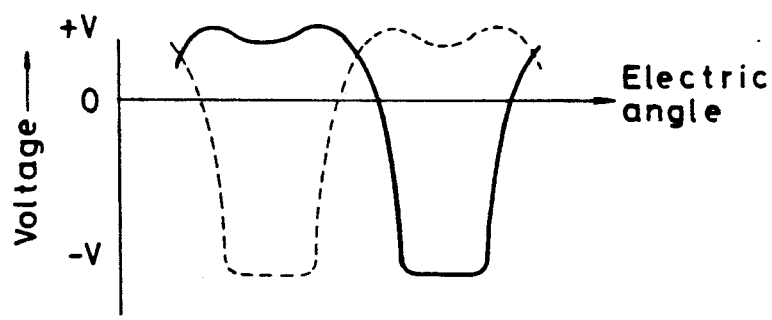
FIG. 11(c) is a graph showing induced voltage waveforms generated in the driving coils 61 and 62 in FIG. 11(a).
Figure 11D:
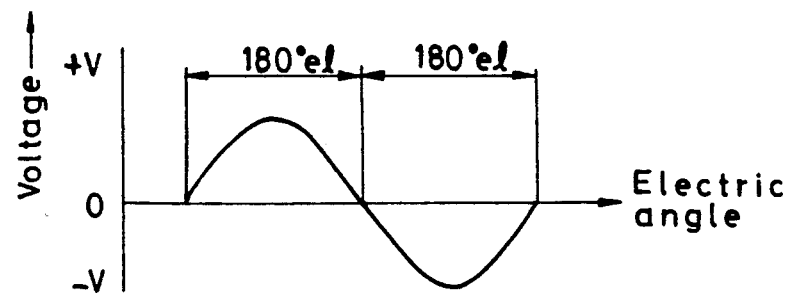
FIG. 11(d) is a graph showing a distribution curve of magnetic flux given by the position detecting part 65b of the rotor magnet 65 in FIG. 11(b).
Figure 12A:
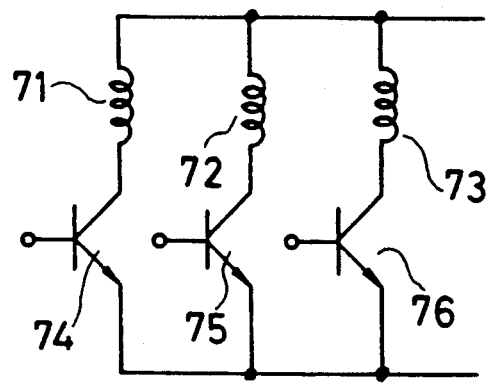
FIG. 12(a) is a circuit diagram showing the conventional driving circuit.
Figure 12B:
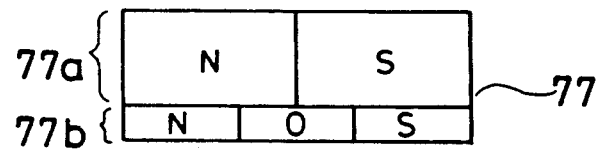
FIG. 12(b) is an illustration showing the conventional developed distribution map of magnetization of a rotor magnet 77.
Figure 12C:
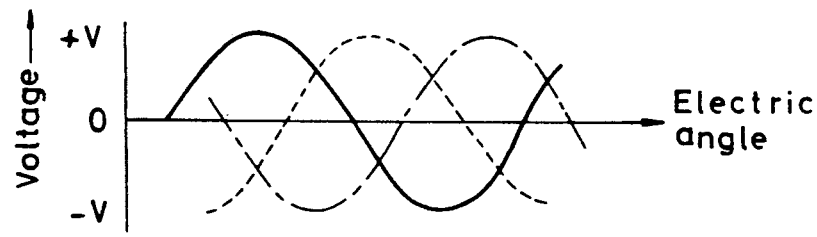
FIG. 12(c) is a graph showing induced voltage waveforms generated in the driving coils 71, 72 and 73 in FIG. 12(a).
Figure 12D:
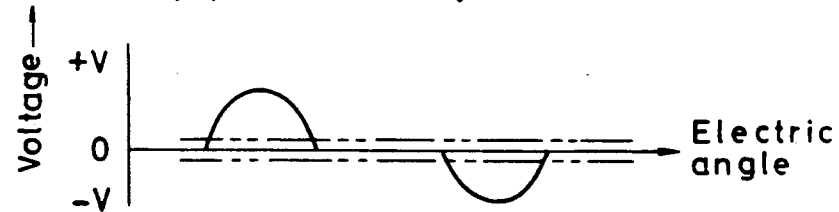
FIG. 12(d) is a graph showing a distribution curve of magnetic flux generated by the position detecting part 77b of the rotor magnet 77 in FIG. 12(b).
Figure 12E:
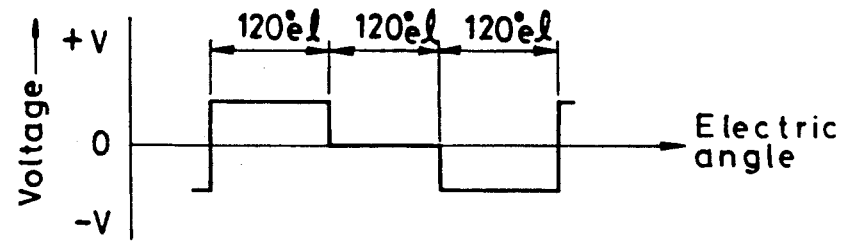
FIG. 12(e) is a graph showing a driving signal for the conventional motor.

FIG. 9a is a circuit diagram showing the whole circuit of the signal processing circuit 14'. The signal processing circuit 14' consists of a pair of main circuits 14C, 14D and an OR circuit element 86. The main circuit 14C has been shown in FIG. 9, and the main circuit 14D is the same circuit as the main circuit 14C. Input ends 141D and 142D correspond to the input ends 141C and 142C, respectively. Output ends 143D and 144D correspond to the output ends 143C and 144C, respectively.

When a positive signal of the signal "b" shown by FIG. 8 is supplied to the input end 141C as the first input signal and an inverted signal of the signal "c" shown by FIG. 8 is supplied to the input end 142C as the second input signal, the signals "e" and "f" are obtained as the first output signals and the second output signals of the main circuit 14C, respectively. Similarly, when an inverted negative signal of the signal "b" shown by FIG. 8 is supplied to the input end 141D as the first input signal and an inverted signal of the signal "d" of FIG. 9 is supplied to the input end 142D as the second input signal, the signals "g" and "h" are obtained as the first output signals and the second output signal of the main circuit 14D, respectively. Further, as aforementioned, the signal "i" is obtained from the signals "f" and "g" through the OR circuit element 86. It is not necessary at the time of starting to synchronize the driving signal with the positional signal of the rotor. What is needed for the motor to start is only an initializing pulse supplied to the first input terminal of the logic element 32 at the time of power-on. This results in a state that the motor makes reverse-rotation at the time of starting in each duration which is from zero to a value over a positive threshold Tp or from zero to a value over a negative threshold Tn shown in the waveform "a" of FIG. 8. However, the motor turns to the forward-rotation mode as soon as the above duration lapse, and thereafter the afore-mentioned two-phase full-wave driving is carried out.

Apart from the above-mentioned second embodiment wherein alignment of poles in each region of the position detecting magnet 31b is O-N or O-S from the left as shown in FIG. 7(a), another embodiment may be such that the above-mentioned alignment is N-O or S-O from the left and the signal processing circuit 14' is changed in accordance therewith.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A driving apparatus for DC brushless motor comprising:
    a driving magnet for causing torque and has plural number of magnetized poles;
    a position detecting magnet for generating a position signal and has said plural number of regions corresponding to said magnetized poles, each of said regions including a non-magnetized part and at least one magnetized pole of same kind as a corresponding pole of said driving magnet per an electric angle of 180°;
    a magnetic detecting element for detecting magnetic flux which is generated by said position detecting magnet;
    an amplifier for amplifying a position signal issued from said magnetic detecting element;
    a waveform shaping circuit for separating an output signal of said amplifier into plural signals corresponding to said regions of said position detecting magnet;
    a signal processing circuit for composing full-wave driving signals from said plural signals; and
    a driving circuit for applying said full-wave driving signals to a driving coil of said DC brushless motor.

2. A driving apparatus for DC brushless motor in accordance with claim 1, wherein
    each of said regions of the position detecting magnet is divided equally in substance into N, O and N poles in this order in correspondence with an N pole of said driving magnet and divided equally in substance into S, O and S poles in this order in correspondence with an S pole of said driving magnet, wherein said O pole defines a non-magnetized part.

3. A driving apparatus for DC brushless motor in accordance with claim 1, wherein
    each of said regions of the position detecting magnet is divided equally in substance into O and N poles in this order in correspondence with an N pole of said driving magnet and divided equally in substance into O and S poles in this order in correspondence with an S pole of said driving magnet, wherein said O pole defines a non-magnetized part.

* * * * *